(12) United States Patent
Kudo et al.

(10) Patent No.: US 8,379,246 B2
(45) Date of Patent: Feb. 19, 2013

(54) INFORMATION PROCESSING APPARATUS AND COMPUTER USABLE MEDIUM THEREFOR

(75) Inventors: Yasuhiro Kudo, Aichi (JP); Masafumi Miyazawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1291 days.

(21) Appl. No.: 12/076,685

(22) Filed: Mar. 21, 2008

(65) Prior Publication Data

US 2008/0239388 A1    Oct. 2, 2008

(30) Foreign Application Priority Data

Mar. 30, 2007  (JP) ................. 2007-095205

(51) Int. Cl.
*G06F 15/00* (2006.01)
(52) U.S. Cl. ............ 358/1.15; 358/1.1; 358/1.9
(58) Field of Classification Search .......... 358/1.1, 358/1.15, 1.13
See application file for complete search history.

(56) References Cited

U.S. PATENT DOCUMENTS

| | | | |
|---|---|---|---|
| 6,734,985 | B1 | 5/2004 | Ochiai |
| 7,269,763 | B2 * | 9/2007 | Maehara ............ 358/1.15 |
| 2006/0031906 | A1 | 2/2006 | Kaneda |
| 2009/0327407 | A1 * | 12/2009 | Gropper ............ 709/203 |

FOREIGN PATENT DOCUMENTS

| | | |
|---|---|---|
| JP | 2000-137585 | 5/2000 |
| JP | 2000-181825 | 6/2000 |
| JP | 2006-050465 | 2/2006 |
| JP | 2006-087058 | 3/2006 |

OTHER PUBLICATIONS

Japanese Official Action dated Jun. 7, 2011 from JP 2007-095205.

* cited by examiner

*Primary Examiner* — King Poon
*Assistant Examiner* — Iriana Cruz
(74) *Attorney, Agent, or Firm* — Scully, Scott, Murphy & Presser, P.C.

(57) ABSTRACT

An information processing apparatus having a request receiving unit to receive a request issued from a client device for event information, a destination device determining unit to determine the client device which issued the request as a destination device of the event information, a destination device information storing unit to store first destination device information which specifies the destination device, an event information providing unit to provide the event information to the destination device according to the first destination device information, a first cancellation unit to invalidate the first destination device information when delivery of the event information failed, and a second cancellation unit to invalidate second destination device information, which specifies the identical destination device according to the removal of the first destination device information when the second destination device specifying the identical destination device is detected in the destination device information storing unit, is provided.

12 Claims, 10 Drawing Sheets

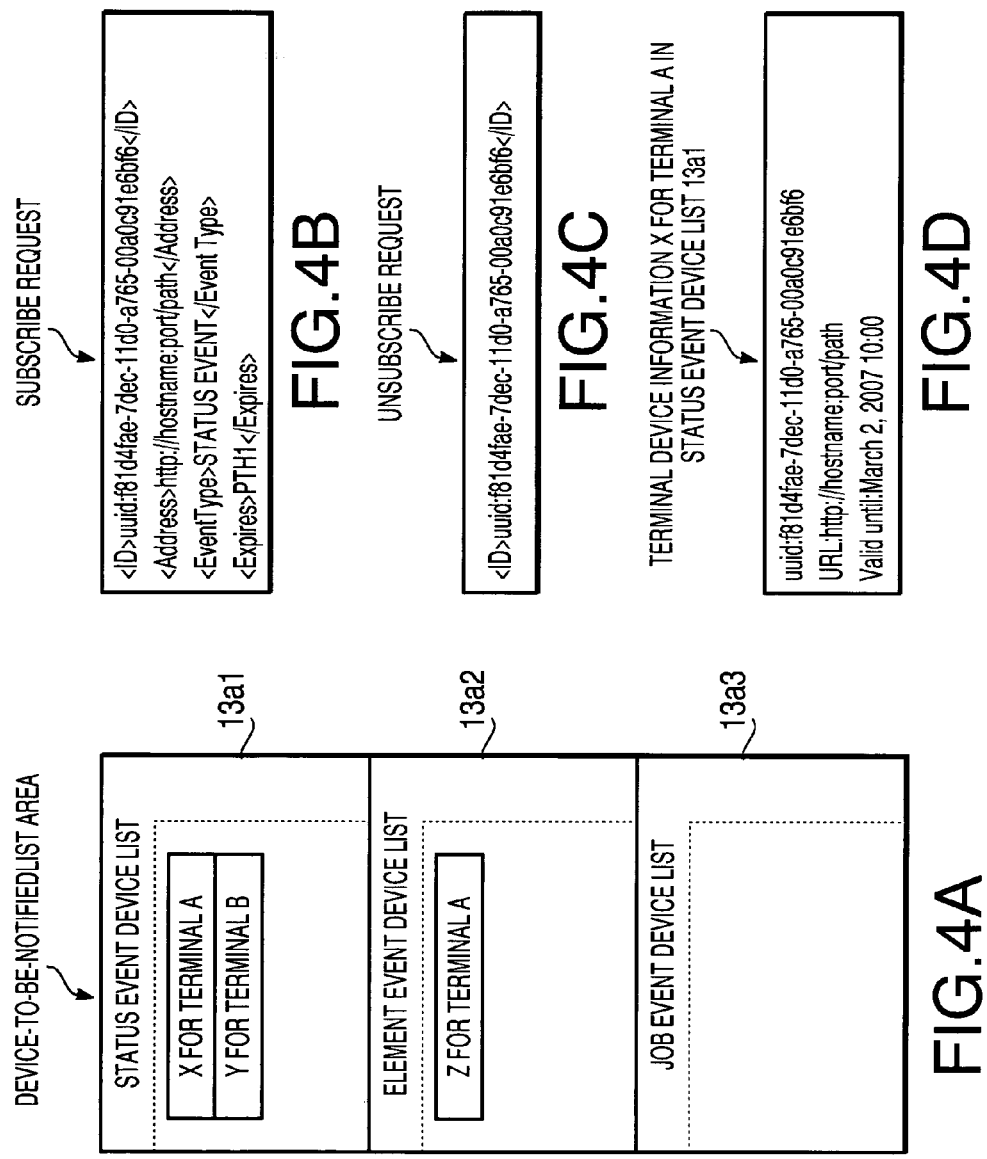

| EVENT TYPES FOR PC TO REQUEST MFP FOR EVENT INFORMATION | CRITERIA TO BE DETECTED FOR EVENT NOTIFICATION |
|---|---|
| STATUS EVENT | AN ERROR, AN ERROR SOLVED IN MFP |
| ELEMENT EVENT | CONFIGURATION CHANGE IN MFP |
| JOB EVENT | STATE TRANSITION IN AN ACTIVE JOB IN MFP |

FIG.5A

| ERROR EVENTS TO BE DETECTED BY MFP | TRIGGER FOR THE EVENT |
|---|---|
| COVER-OPEN EVENT | DOCUMENT COVER OF SCANNER UNIT IS OPENED |
| COVER-CLOSE EVENT | DOCUMENT COVER OF SCANNER UNIT IS CLOSED |
| NO-INK EVENTN | INK IN PRINTING UNIT RUNS OUT |
| NO-SHEET EVENT | RECORDING SHEET IN PRINTING UNIT RUNS OUT |

FIG.5B

INFORMATION PROCESSING APPARATUS AND COMPUTER USABLE MEDIUM THEREFOR

CROSS REFERENCE TO RELATED APPLICATION

This application claims priority from Japanese Patent Application No. 2007-095205, filed on Mar. 30, 2007. The entire subject matter of which is incorporated herein by reference.

BACKGROUND

1. Technical Field

An aspect of the present invention relates to an information processing apparatus, which is capable of monitoring events occurring in the apparatus itself and providing client devices with information concerning the events, and a computer usable medium therefor.

2. Related Art

Conventionally, an information processing apparatus capable of monitoring events which occur in the apparatus itself and providing a plurality of client devices with information concerning the events is known. An example of such an information processing apparatus is disclosed in Japanese Patent Provisional Publication 2006-87058. The information processing apparatus in the above-referenced publication provides the client devices with information concerning an event, which is relevant to the client devices when the event occurs in the information processing apparatus. Therefore, information concerning various events that may occur in the information processing apparatus is stored in association with information concerning each client device in a storage of the information processing apparatus so that the information concerning the event is provided to the associated client devices when the event occurs.

In the information processing apparatus, however, the information concerning the events may not be correctly delivered to the client devices due to communication failure which occurs, for example, in a LAN. Additionally or alternatively, the information may not be delivered because an application program in the client device to receive the information is in an inoperable condition. The information concerning the events is delivered to the client devices based on information concerning the client devices, which is associated with the event and stored in the information processing apparatus, regardless of the communication status between the information processing apparatus and the client devices. Therefore, delivery of the information concerning events which occur during the communication failure is continuously attempted although the client devices are incapable of receiving the information. Accordingly, when a plurality of events occur in a period of time and/or there are a large number of undeliverable client devices, network resources can be wasted for the communication with the undeliverable client devices, and delivery of the information to the other deliverable client devices can be undesirably delayed.

SUMMARY

In view of the above problem, the present invention is advantageous in that an information processing apparatus, which is capable of monitoring events occurring the information processing apparatus itself and providing information concerning the events to the deliverable client devices smoothly with less workloads in the network, and a computer usable medium therefore are provided.

According to an aspect of the invention, there is provided an information processing apparatus. The information processing apparatus includes a request receiving unit to receive a request issued from a client device for event information concerning an event, which occurred in the information processing apparatus, a destination device determining unit to determine the client device which issued the request as a destination device of the event information to be provided, a destination device information storing unit having a plurality of storing areas to store destination device information on basis of the request, the destination device information including first destination device information which specifies the destination device, an event information providing unit to provide the event information to the destination device according to the first destination device information, a first cancellation unit to invalidate the first destination device information from the destination device information storing unit when delivery of the event information to the destination device failed, and a second cancellation unit to invalidate second destination device information, which specifies the destination device being identical to the destination device specified by the first destination device, from the destination device information storing unit according to the cancellation of the first destination device information from the destination device information storing unit when the second destination device specifying the identical destination device is detected in the destination device information storing unit.

According to another aspect of the invention, there is provided a computer usable medium containing computer readable instructions for controlling an information processing apparatus to monitor an event which occurs in the information processing apparatus and provide event information concerning the event to at least one client device which is connectable with the information processing apparatus. The computer readable instructions include steps of receiving a request issued from the client device for the event information, determining the client device which issued the request as a destination device of the event information to be provided, storing destination device information on basis of the request in one of a plurality of storing areas in a destination device information storing unit, the destination device information including first destination device information which specifies the destination device, providing the event information to the destination device according to the first destination device information, canceling the first destination device information from the destination device information storing unit when delivery of the event information to the destination device failed, and further canceling second destination device information, which specifies the destination device being identical to the destination device specified by the first destination device, from the destination device information storing unit according to the removal of the first destination device information from the destination device information storing unit when the second destination device specifying the identical destination device is detected in the destination device information storing unit.

According to the above configurations, when delivery of the event information fails, the first destination device information is invalidated in the destination device information storing unit, and the second destination device information specifying the identical destination device is invalidated in the destination device information storing unit as well. Thus, the destination device information concerning a client device which can be anticipated to fail in succeeding delivery of event information can be invalidated in the destination device information storing unit in advance. Therefore, event information concerning another event which occurs in the information processing apparatus is prevented from being unnecessarily transmitted so that workloads in a network can be reduced whilst the event information can be delivered to the other client devices which are capable of receiving effectively.

BRIEF DESCRIPTION OF THE
ACCOMPANYING DRAWINGS

FIG. 1 schematically illustrates a configuration of an MFP (multi-function peripheral) and PCs (personal computers) according to an embodiment of the present invention.

FIGS. 4A-4D schematically illustrate contents of information to be exchanged between the MFP and the PC according to the embodiment of the present invention.

FIGS. 5A-5B schematically illustrate event types and events which can occur in the MFP according to the embodiment of the present invention.

Figure 6:
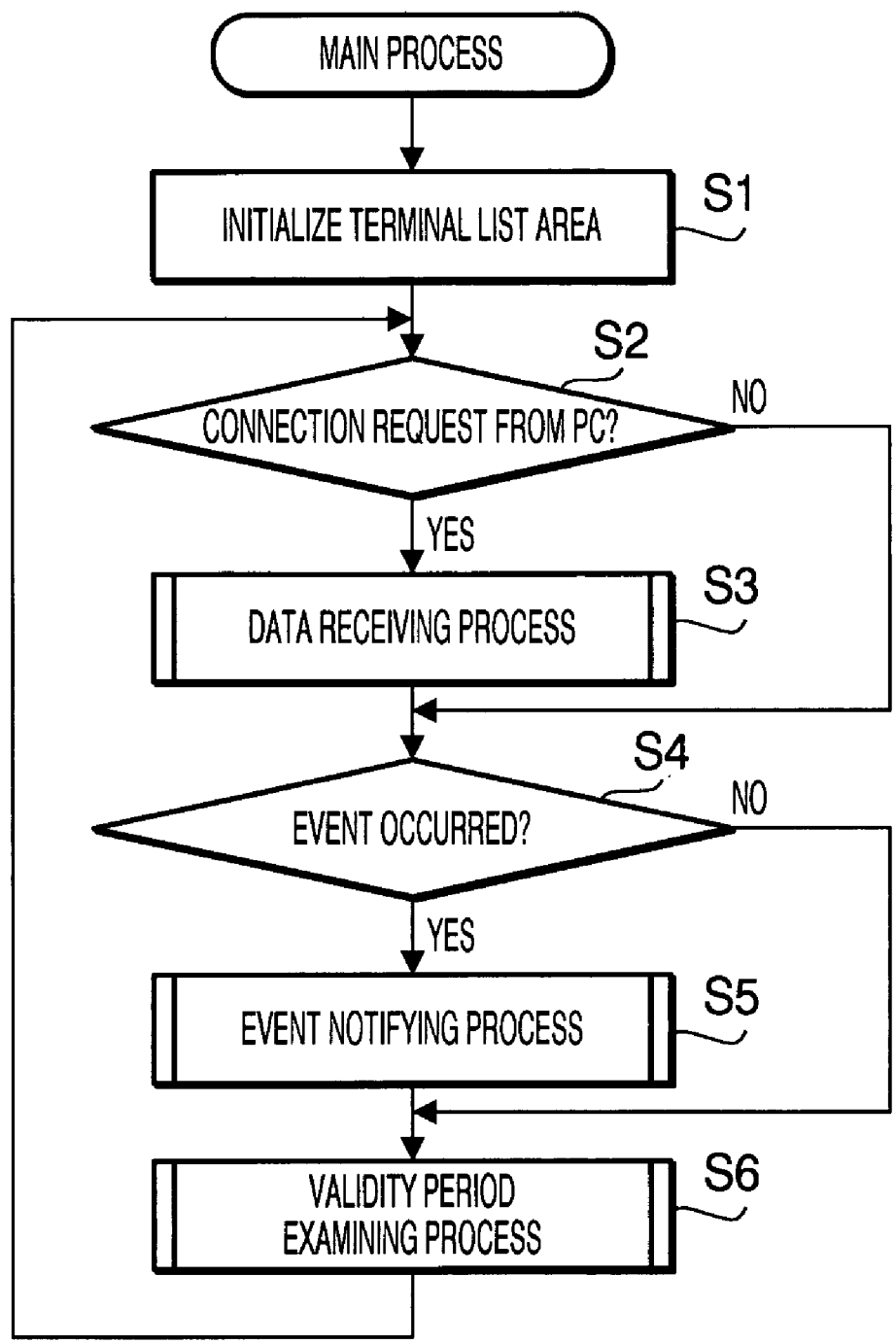

FIG. 6 is a flowchart to illustrate a main process of the MFP according to the embodiment of the present invention.

Figure 7:
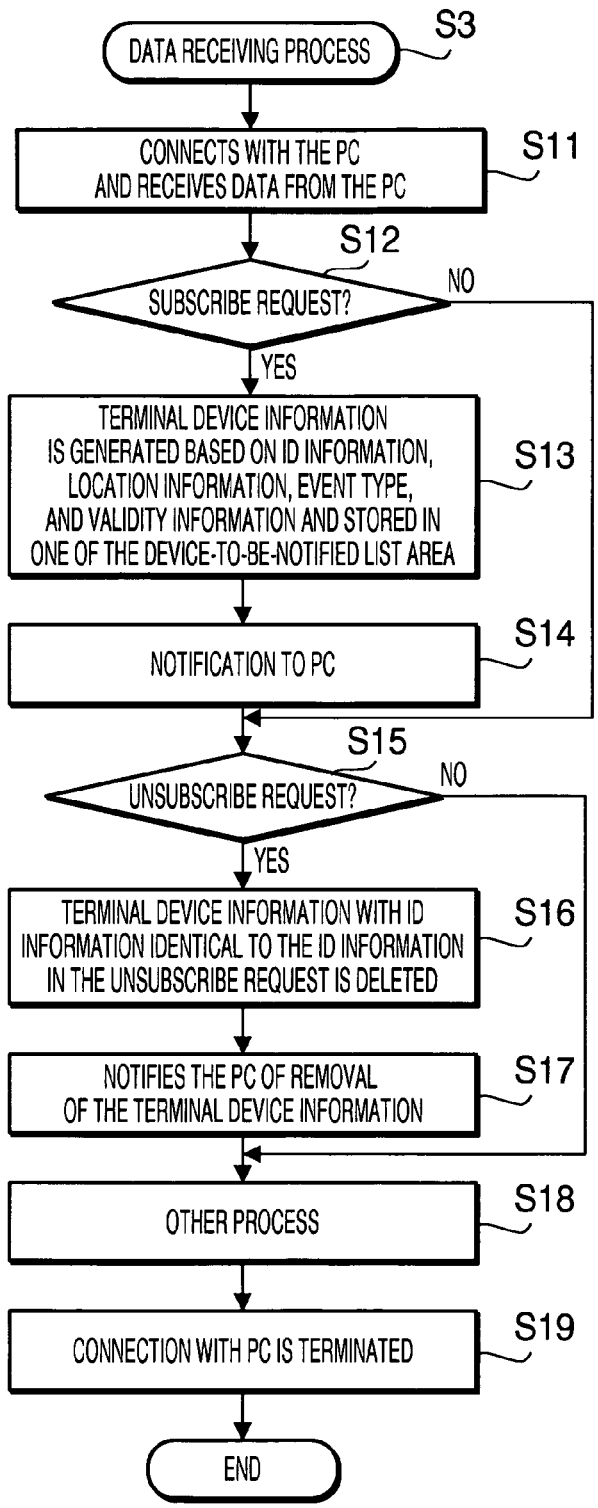

FIG. 7 illustrates a flowchart of a data receiving process to be executed by the MFP according to the embodiment of the present invention.

Figure 8:
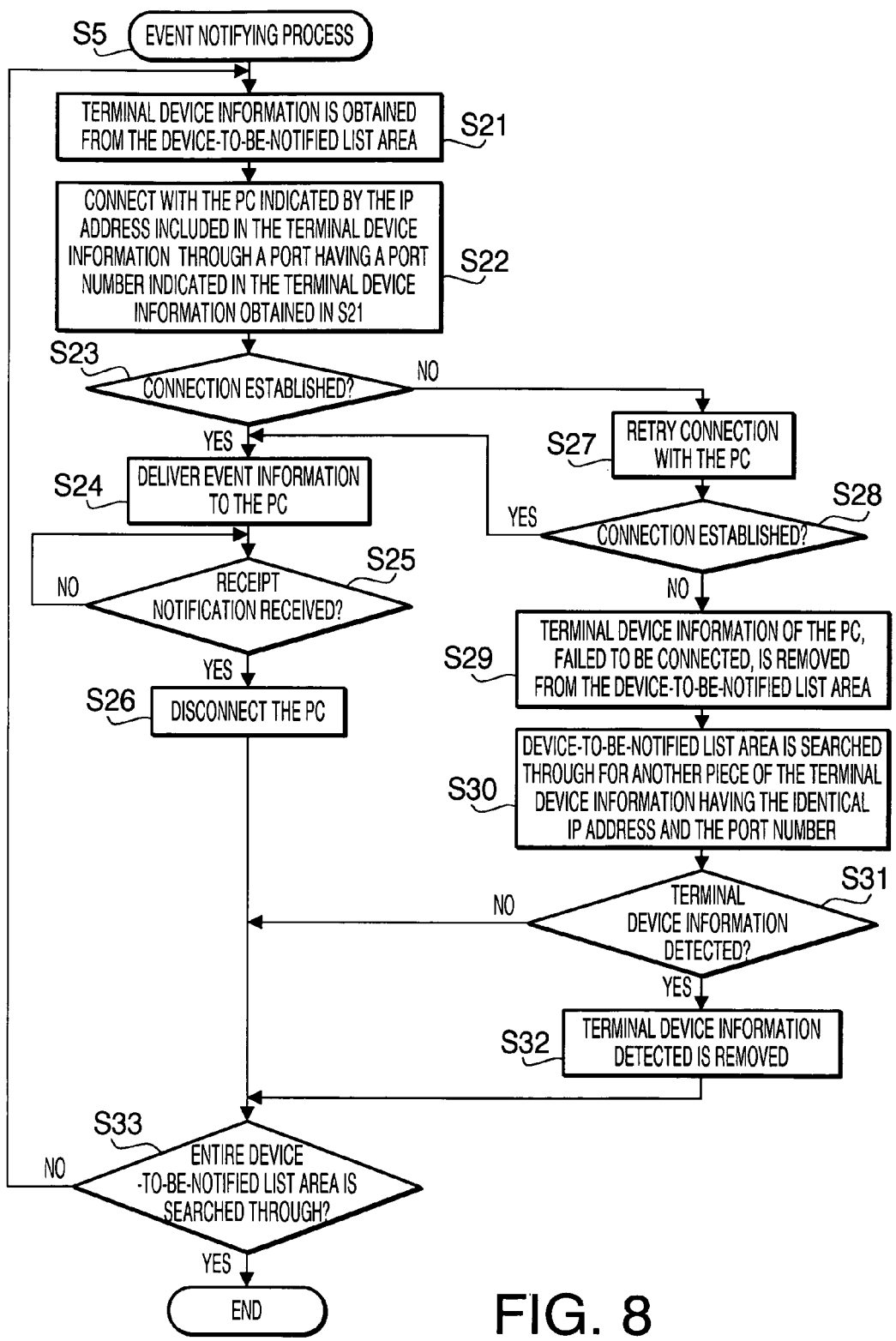

FIG. 8 is a flowchart to illustrate an event notifying process according to the embodiment of the present invention.

Figure 9:
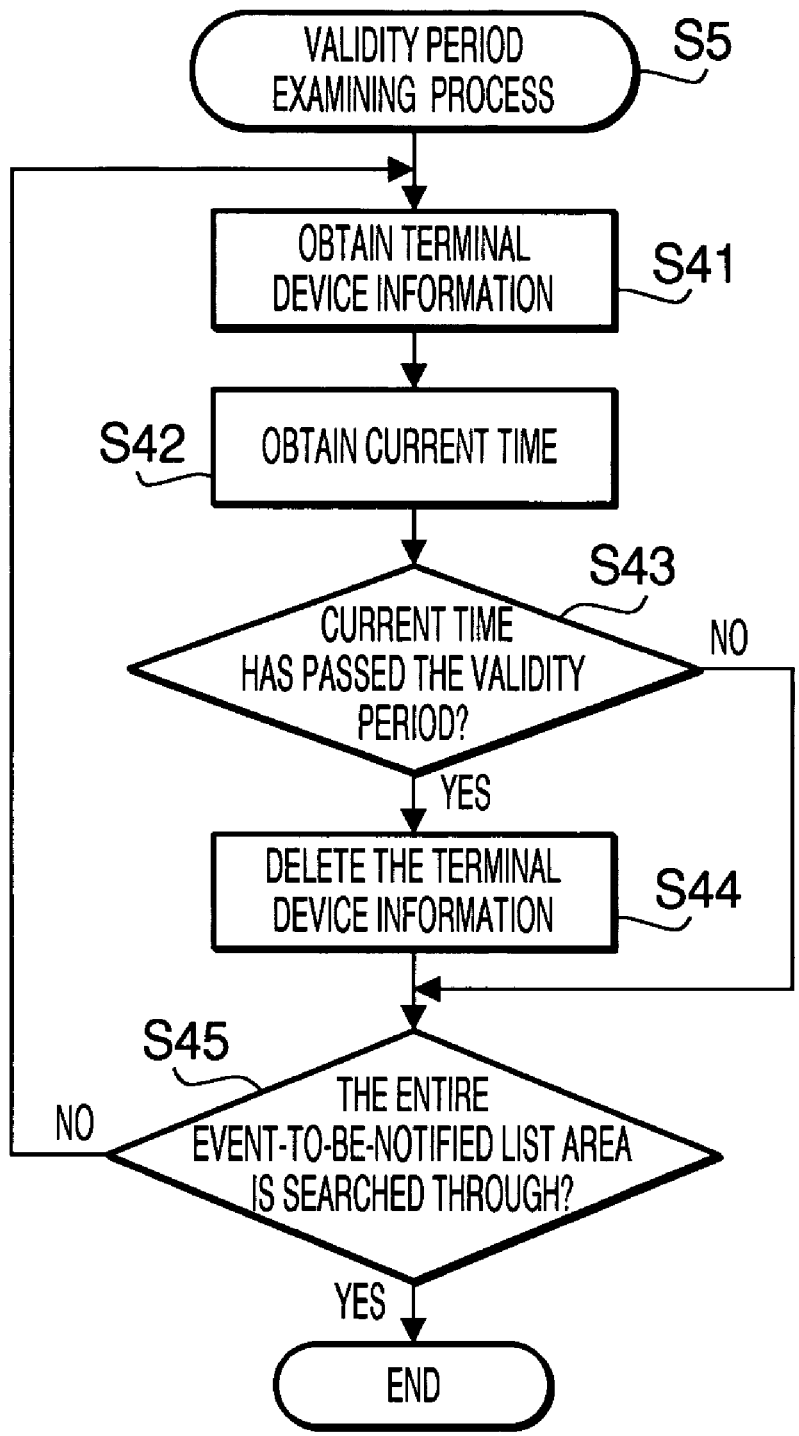

FIG. 9 is a flowchart to illustrate a validity period examining process according to the embodiment of the present invention.

Figure 10:
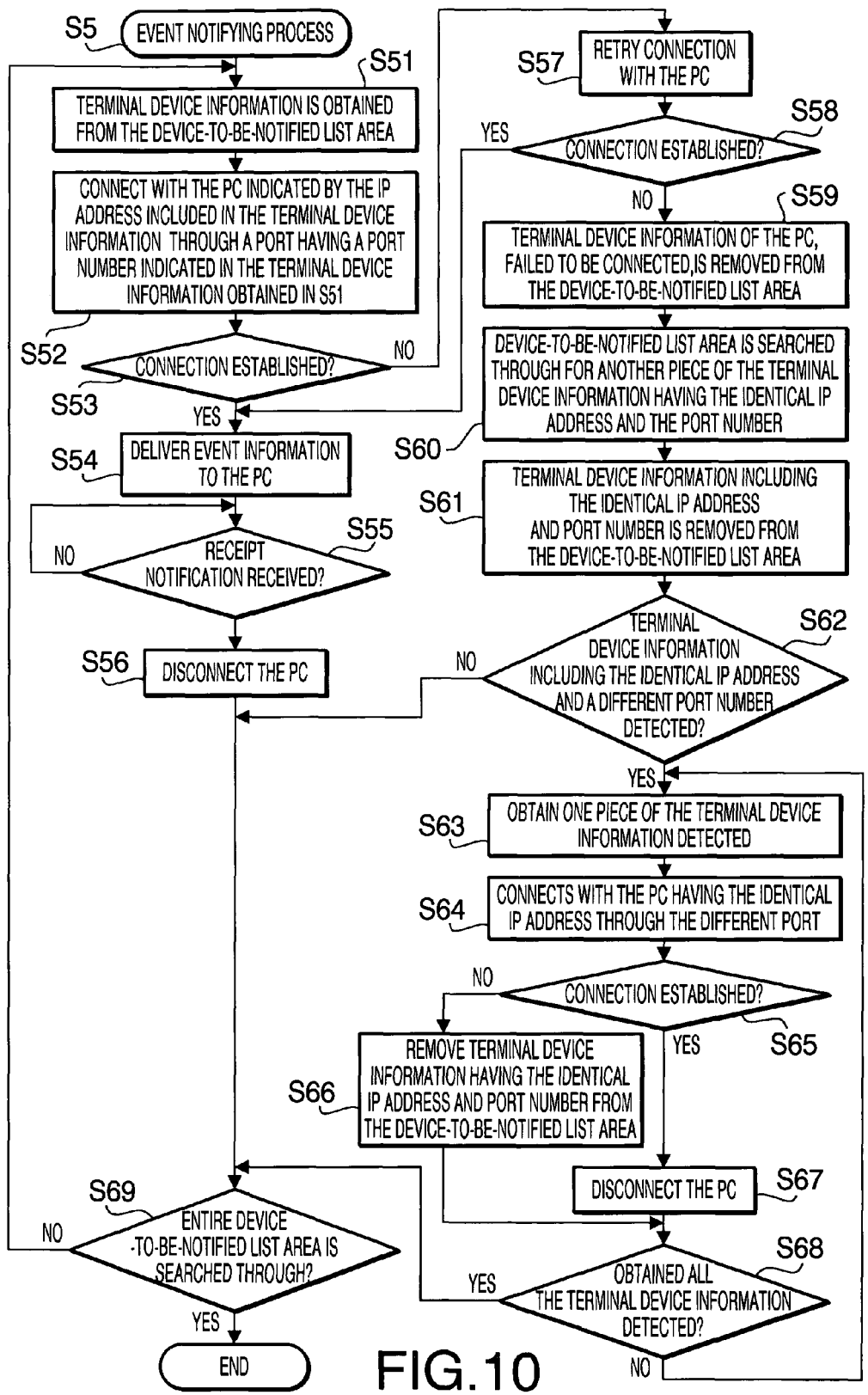

FIG. 10 is a flowchart to illustrate a variation of the event notifying process according to the embodiment of the present invention.

DETAILED DESCRIPTION

Hereinafter, an embodiment according to an aspect of the present invention will be described with reference to the accompanying drawings.

Figure 1:
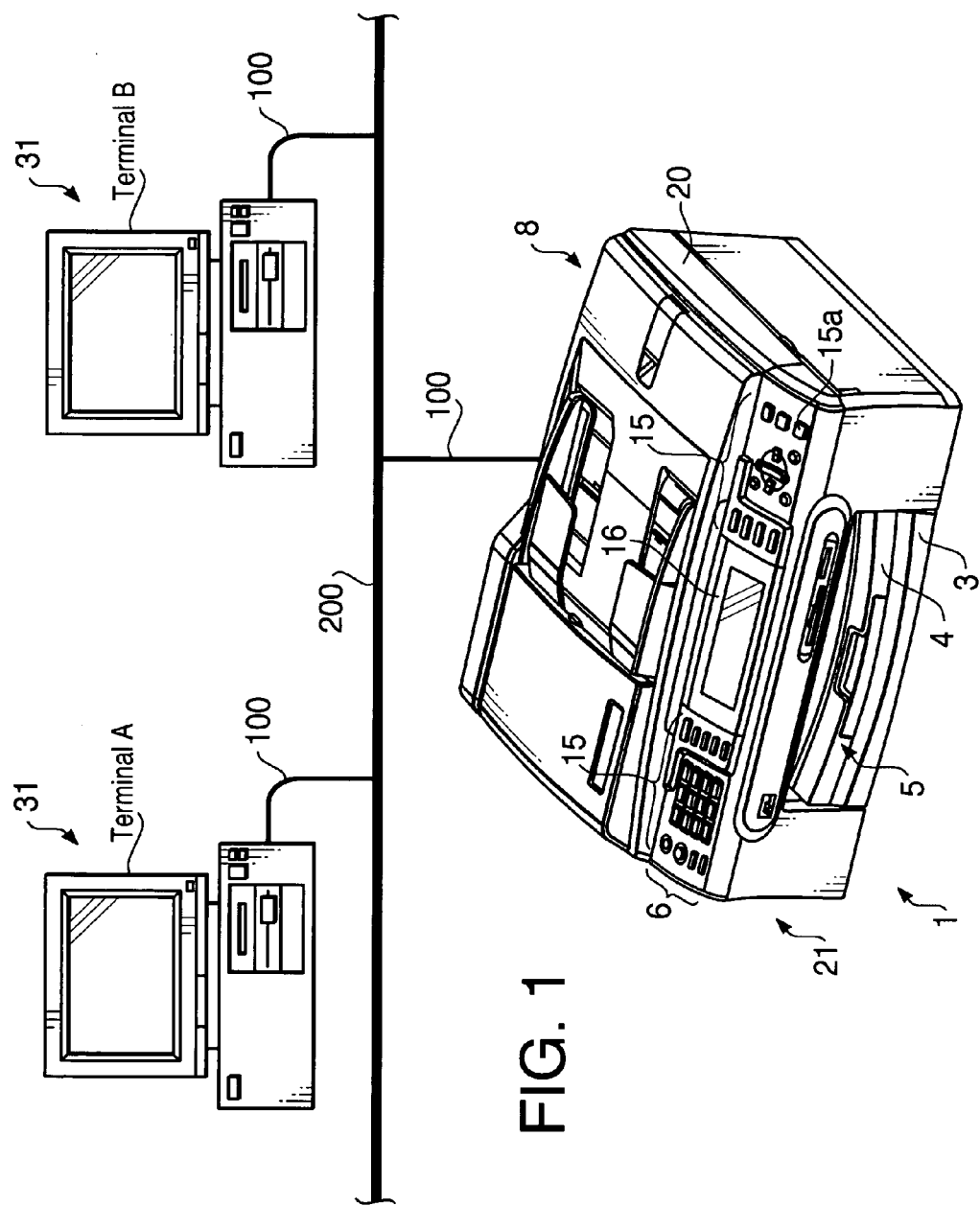

FIG. 1 schematically illustrates a configuration of an MFP 1 and a plurality of PCs 31 according to an embodiment of the present invention. Specifically, the MFP 1 is illustrated in a perspective view in FIG. 1. The MFP 1 in the present embodiment is provided with a plurality of information processing functions such as a printing function, a scanning function, and a copying function.

As shown in FIG. 1, the MFP 1 and the plurality of PCs 31, which may be also referred to as terminal A and terminal B respectively) are connected with one another through a LAN 200 to exchange data therebetween. Therefore, a user may utilize the functions of the MFP 1 through any of the PCs 31 and the LAN 200. For example, a piece of printable data can be transmitted from the terminal A to the MFP 1 so that an image according to the printable data is printed by a printing unit 21 (see FIG. 2). For another example, an image formed on a sheet of paper can be read by a scanner unit 20 (see FIG. 2) to generate a piece of image data, and the image data can be transmitted from the MFP 1 to the terminal B to be modified.

In the MFP 1 according to the present embodiment, various state transitions in the MFP 1 are detected as events. Such events include an error and completion of a printing operation, for example. More specifically, the MFP 1 is provided with various sensors, such as a cover open/close sensor 20a, a remaining ink amount detecting sensor 21a, and a recording sheet detecting sensor 21b (see FIG. 2), which outputs signals to indicate predetermined states of an operation and conditions of the MFP 1. These signals are monitored by a CPU 11 (see FIG. 2) at predetermined intervals. When the signals from the sensors vary, the CPU 11 detects the variation as an event.

The MFP 1 according to the present embodiment includes a document cover 8 on a top surface thereof and an operation panel 6 in a front portion of the top surface. The operation panel 6 includes operation keys 15, an LCD (liquid crystal display) 16, and a speaker unit 17 (see FIG. 2). The user is allowed to enter various instructions to the MFP 1 through the components in the operation panel 6.

The LCD 16 displays various information such as instructions to the user (e.g., operation menus), current status of an ongoing operation, a condition of the MFP 1. When an event occurs in the MFP 1, the PCs 31 are notified of the information concerning the event, and concurrently, the same information is displayed on the LCD 16 to be presented to the user.

Figure 2:
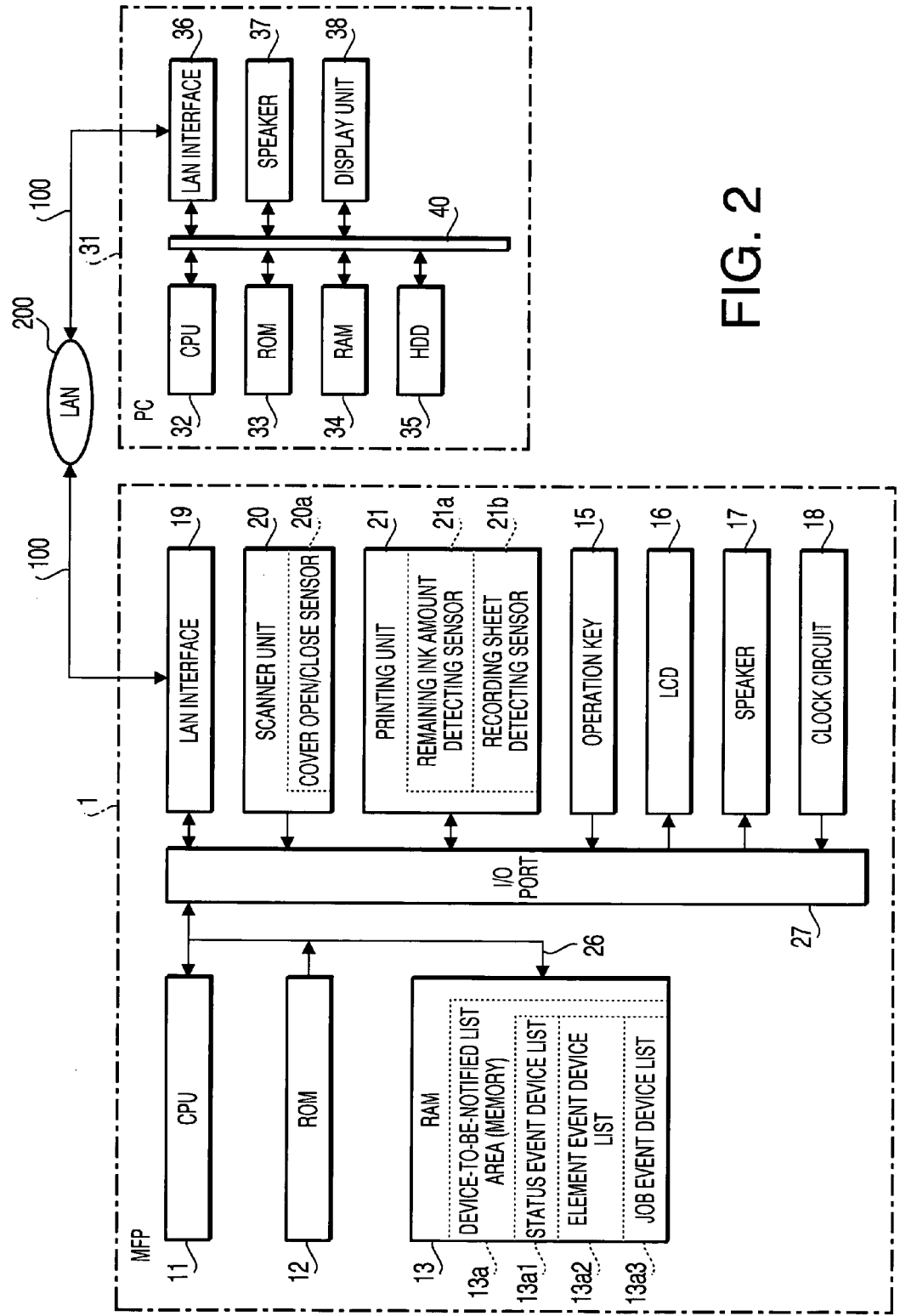
FIG. 2 is a block diagram to illustrate electrical configurations of the MFP and the PC according to the embodiment of the present invention.

Next, an electrical configuration of the MFP 1 will be described. FIG. 2 is a block diagram to illustrate an electrical configuration of the MFP 1 and one of the PCs 31 according to the embodiment of the present invention. The MFP 1 includes the CPU 11, a ROM 12, and a RAM 13, which are interconnected through a bus line 26, and the operation keys 15, the LCD 16, the speaker unit 17, a clock circuit 18, a LAN interface 19, the scanner unit 20, and the printing unit 21, which are interconnected through an I/O port 27. The clock circuit 18 includes an internal clock to indicate current date. The I/O port 27 and the CPU 11, the ROM 12, the RAM 13 are interconnected through the bus line 26.

The CPU 11 controls operations of each of the components in the MFP 1 according to various information and programs stored in the ROM 12 and the RAM 13, and various information exchanged through the LAN interface 19. The ROM 12 is a read-only memory to store various information such as controlling programs to be executed by the CPU 11.

The RAM 13 is a rewritable volatile memory to temporally store various information during the operations in the MFP 1. The RAM 13 is provided with a device-to-be-notified list area 13a. The device-to-be-notified list area 13a stores terminal device information, indicating to which PC 31 event information should be transmitted when an event occurs. The event information includes information concerning the event occurred in the MFP 1 such as a name of the event (event name) and current status of the event.

More specifically, the terminal device information is generated based on a subscribe request, which is transmitted from the PC 31 to the MFP 1. The generated terminal device information is classified into and stored in one of notifying lists in the device-to-be-notified list area 13a according to an event type indicated in the subscribe request. The event types in the present embodiment include a status event, an element event, and a job event. FIG. 5A illustrates correspondence between the types of the events, which can be notified to the PCs 31 from the MFP, 1 and requirements to be met for the MFP 1 to notify the PCs 31 of the events. In the present embodiment, as shown in FIG. 5A, a status event can be notified to the PCs 31 when an error is detected in the MFP 1 and when recovery from the error is detected. An element event can be notified to the PCs 31 when information concerning a configuration of the MFP 1 is detected. A job event can be notified to the PCs 31 when a change in operational state of a job running in the MFP 1 is detected. The terminal device information can be stored in one of a list of PCs 31 to be notified of the status event (status event device list 13a1), a list of PCs 31 to be notified of the element event (element event device list 13a2), and a list of PCs 31 to be notified of the job event (job event device list 13a3). Details of the subscribe request will be described later.

Next, referring again to FIG. 2, an electrical configuration of the PC 31 will be described. The PC 31 includes a CPU 32, a ROM 33, a RAM 34, an HDD (hard disk drive) 35, a LAN interface 36, an input unit 37, and a display unit 38, which are interconnected through a bus line 40.

The CPU 32 controls operations of each of the components in the PC 31 according to various information and programs stored in the ROM 12, the RAM 13, and the HDD 35 and various information exchanged through the LAN interface 36.

The ROM 12 is a read-only memory to store various information such as controlling programs to be executed by the CPU 32. The HDD 35 is a rewritable nonvolatile data storage, and data stored therein is maintained even when electricity to the PC 31 is turned off. The HDD 35 stores various application programs, various data created in the application programs, and subscribe requests created in the application programs.

The LAN interface 36 is a known circuit which provides connection between the PC 31 and a LAN 200 to enable data exchange between the PC 31 and other external devices being connected to the LAN 200.

The input unit 37 is operated by the user to manipulate the PC 31 and includes, for example, a keyboard and a mouse. The display unit 37 displays various information to be presented to the user and includes, for example, a liquid crystal display.

Figure 3A:
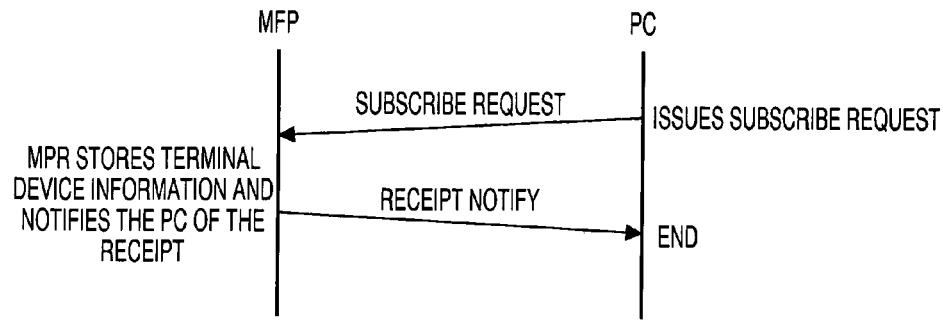
FIGS. 3A-3C are ladder charts to illustrate data flows to be exchanged between the MFP and the PC according to the embodiment of the present invention.
Figure 3B:
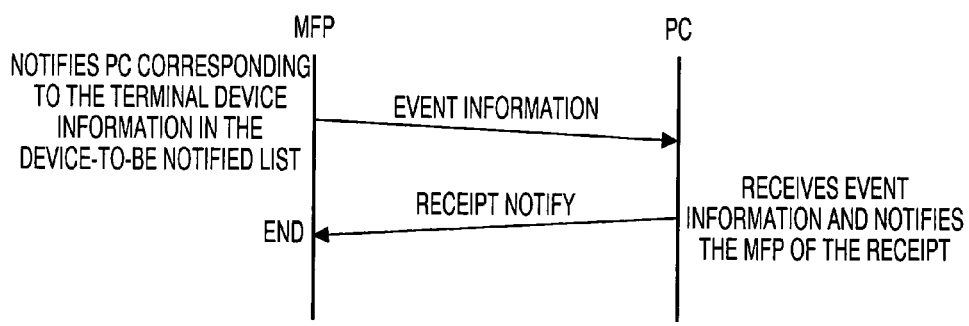
Figure 3C:
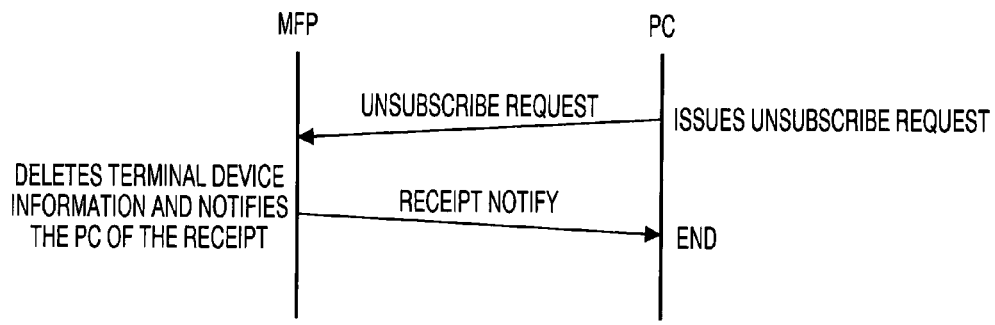

Next, referring to FIGS. 3A-3C, requests and event information to be exchanged between the MFP 1 and the PC 31 will be described. FIGS. 3A-3C are ladder charts to illustrate data flows to be exchanged between the MFP 1 and the PC 31 according to the embodiment of the present invention.

FIG. 3A illustrates the PC 31 transmitting a subscribe request to the MFP 1 and the MFP 1 receiving the request. The subscribe request is a data piece to be transmitted preliminarily from the PC 31 to the MFP 1 to request the MFP 1 to provide event information when an event occurs in the MFP 1.

Referring to FIG. 4B, an example of the subscribe request will be described. In the present embodiment, the subscribe request is described in the XML (extensible markup language) and includes ID information, location information, information to indicate an event type, and validity information. FIG. 4B illustrates contents of the subscribe request according to the embodiment of the present invention. The ID information is for the MFP 1 and the PC 31 to recognize the request. The location information (i.e., URL) indicates a location of the PC 31 to which the event information should be provided. The event type indicates a type of the event, of which event information is required. The validity information indicates a period of time within which the event information is required.

As shown in FIG. 4B, character strings enclosed in <ID> and </ID> tags in a first line in the subscribe request (i.e., "uuid:f81d4fae-7dec-11d0-a765-00a0c91e6bf6") indicates the ID information of the subscribe request. The ID information includes randomly collected unique character strings UUID (universally unique identifier), which are created each time a subscribe request is generated in the PC 31. Thus, the MFP 1 identifies the subscribe requests transmitted from the PCs 31, unsubscribe requests, which will be described later, and the terminal device information by the ID information.

Character strings enclosed in <Address> and </Address> tags in a second line (i.e., "http://hostname:port/path") indicates the location (i.e., URL) to which the event information should be provided from the MFP 1. The URL (uniform resource locator) is a known method to describe a location of various elements including information, data, apparatuses, and services existing in a network such as the Internet. The "hostname" in the URL indicates a host name or an IP address of the PC 31 which generated the subscribe request, and the "port" indicates a port number. The port number is identifying information of an application program in the PC 31, among a plurality of application programs, to which the event information is provided. Thus, the port number indicates the application program which generated the subscribe request. A character string "path" indicates a path name such as a folder name and a file name provided in the HDD 35 of the PC 31 which generated the subscribe request. The folder name and the file name can be arbitrarily created by the user.

Character strings enclosed in <EventType> and </EventType> tags in a third line (i.e., "status event") indicates the type of the event of which event information is requested by the PC 31. The event types include, for example, "status event", "element event", and "job event", as shown in FIG. 5A. One of the three event types is specified by the application program or by the user and indicated in the subscribe request.

Character strings enclosed in <Expires> and </Expires> tags in a fourth line (i.e., "PT1H") indicates the validity information of the subscribe request. The "PT" is an abbreviation of "period of time", and in this example, "PT1H" indicates that the validity period of the subscribe request is one hour. Therefore, the MFP 1 notifies the event information of the event indicated in the subscribe request to the PC 31 for one hour starting from the time when the MFP 1 receives the subscribe request. Once the one hour expires, event information of an event occurring in the MFP 1 is no longer provided to the PC 31.

The MFP 1 receiving the subscribe request described as above from the PC 31 collects the event type and the ID information, the location information, and the validity information. The validity period is calculated based on current time being obtained from the clock circuit 18 and the validity information included in the subscribe request. For example, if the subscribe request is received on 9:00 o'clock on Mar. 2, 2007, and the validity information indicates "PT1H", the subscribe request is effective until 10:00 o'clock on Mar. 2, 2007.

The information thus collected from the subscribe request is stored in one of the status event device list 13a1, the element event device list 13a2, and the job event device list 13a3 in the device-to-be-notified list area 13a according to the event type indicated in the subscribe request.

For example, if the event type indicated in the subscribe request is "status event", the ID information, the location information, the validity information are generated to be the terminal device information of the PC 31 and stored in the status event device list 13a1. If the event type in the subscribe request is "element event", the generated terminal device information is stored in the element event device list 13a2. Similarly, if the event type in the subscribe request is "job event", the terminal device information is stored in the job event device list 13a3.

FIG. 4A illustrates contents of the device-to-be-notified list area 13a in the RAM 13 according to the embodiment of the present invention. It is shown in FIG. 4A that a subscribe request for a status event from the terminal A, a subscribe request for an element event from the terminal A, a subscribe request for a status event from the terminal B were issued and transmitted to the MFP 1. The MFP 1 receiving the subscribe requests generates terminal device information X, Y, and Z for the terminal devices A, B, and A respectively. The terminal device information X and Y are stored in the status event device list 13a1, and the terminal device information Z is stored in the element event device list 13a2.

It is noted that the device-to-be-notified list area 13a includes the terminal device information X and Z, both of which indicate event information should be transmitted to the terminal A when a status event and an element event occur. That is, the terminal device information X and Z are both directed to the terminal A. However, because each ID information included in a subscribe request is universally unique character strings, the terminal device information X and the terminal device information Z are not identical in the device-to-be-notified list area 13a.

FIG. 4D illustrates the contents of the terminal device information X stored in the status event device list 13a1. When the terminal device information is stored in the device-to-be-notified list area 13a, the MFP 1 notifies the PC 31 of the receipt of the subscribe request.

Next, referring to FIG. 3C and FIG. 4C, an example of an unsubscribe request will be described. The unsubscribe request is transmitted from the PC 31 to the MFP 1 in correspondence to the previously issued subscribe request when the PC 31 no longer requires event information of the event. FIG. 3C illustrates the PC 31 transmitting an uhsubscribe request to the MFP 1 and the MFP 1 receiving the request.

FIG. 4C illustrates contents of the unsubscribe request according to the embodiment of the present invention. In the present embodiment, the unsubscribe request is provided solely with ID information. The ID information includes the UUID which was included in the corresponding subscribe request. When the PC 31 issues an unsubscribe request to ask the MFP 1 to no longer provide the event information, the PC 31 includes the UUID included in the subscribe request in the unsubscribe request. It is noted that the ID information is unique and does not overlap any ID information in the other subscribe requests in the MFP 1 and the PC 31, therefore, the MFP 1 can recognize terminal device information to be removed from the device-to-be-notified list area 13a.

The MFP 1 receiving the unsubscribe request from the PC 31 removes the terminal device information having the ID information which is identical to the ID information included in the received unsubscribe request from the device-to-be-notified list area 13a. Thereafter, as shown in FIG. 3C, the MFP 1 notifies the PC 31 of receipt of the unsubscribe request.

Next, referring to FIG. 3B, the event information to be transmitted to the MFP 1 to the PC 31 in response to the subscribe request will be described. FIG. 3B illustrates the MFP 1 transmitting the event information and the PC 31 receiving the event information. When an event occurs in the MFP 1, the MFP 1, which previously received the subscribe request from the PC 31, transmits event information of the event to the PC 31, of which terminal device information is stored in one of the status event device list 13a1, the element event device list 13a2, and the job event device list 13a3. The PC 31 receiving the event information transmits notification of receipt to the MFP 1.

When an event is detected in the MFP 1, the MFP 1 generates the event information, which indicate, for example, a name of the event and status of the event. The event includes an error event such as that the printing unit 21 in the MFP 1 is incapable of printing due to lack of ink (a "no-ink event") or recording sheet (a "no-sheet event"), and that the scanner unit 20 is incapable of reading an image because the document cover 8 on the top surface of the scanner unit 20 is open (a "cover-open event"). Event information can be transmitted to the PC 31 when such errors occur in the MFP 1. With this configuration, the user can be notified of the error in the MFP 1 through the PC 31 (more specifically, the display unit 38 of the PC 31). Therefore, it is not necessary that the user moves to the MFP 1 to inspect the MFP 1 when such errors occur.

Further, it is noted that the PC 31 is not provided with event information of all the events occur in the MFP 1, but event information of the events preliminarily requested by the subscribe request from the PC 31 is exclusively provided to the PC 31. For example, if a subscribe request for event information of an event, of which event type is "status event", is issued from the PC 31 to the MFP 1, and when an error (e.g., an error to be detected by any of the sensors 20a, 21a, 21b such as shortage of ink, absence of recording sheet, etc.) is detected (or recovery from the error is detected), event information to indicate the error (or the recovery) is provided to the PC 31. For another example, if a subscribe request for event information an event, of which event type is "element event" is issued from the PC 31 to the MFP 1, and when a change in configuration of the MFP 1 (e.g., an IP address, a printer name, etc.) is detected, event information to indicate the new configuration is provided to the PC 31. Further, if a subscribe request for event information of an event, of which event type is "job event", is issued from the PC 31 to the MFP 1, and when a change in status of a running job (e.g., print start, print completion, etc.) is detected, event information to indicate the change is provided to the PC 31.

With the above configuration, when a plurality of events in a same event type occur in the MFP 1, the MFP 1 can provide event information corresponding to the events respectively to the PCs 31, which preliminarily issued subscribe requests.

Hereinafter, referring to FIGS. 6-10, processes to be executed by the CPU 11 of the MFP 1 according to the present embodiment will be described.

FIG. 6 is a flowchart to illustrate a main process of the MFP 1 according to the embodiment of the present invention. The process is initiated when the MFP 1 is powered on and repeated until the power is turned off. When the main process starts, in S1, the data stored in the device-to-be-notified list area 13a is initialized. Next, in S2, it is judged as to whether the PC 31 issues a request for connection. If connection is requested (S2: YES), in S3, a data receiving process is executed. If no connection is requested (S2: NO), the process proceeds to S4.

The data receiving process will be described with reference to FIG. 7. FIG. 7 illustrates a flowchart of the data receiving process to be executed by the CPU 11 of the MFP 1 according to the embodiment of the present invention. In this process, the MFP 1 receives various data including a subscribe request and an unsubscribe request from the PC 31 and performs various processes according to the received data.

When the process starts, in S11, the CPU 11 connects the MFP 1 with the PC 31 and receives data transmitted from the PC 31. In S12, it is judged as to whether the received data is a subscribe request. If the received data is a subscribe request (S12: YES), in S13, ID information, location information, information to indicate an event type, and validity information are extracted from the subscribe request to generate terminal device information. The terminal device information is stored in one of the event device lists 13a1, 13a2, 13a3 (determined based on the event type). In S14, the CPU 11 notifies the PC 31 that the terminal device information is stored in the one of the event device lists 13a1, 13a2, 13a3. It is noted that the steps S12-S14 can be indicated as shown in FIG. 3A. In S12, when the received data is not a subscribe request (S12: NO), the process proceeds to S15.

In S15, it is judged as to whether the data received in S11 is an unsubscribe request. If the received data is an unsubscribed request (S15: YES), in S16, the terminal device information having ID information identical to the ID information included in the unsubscribe request is searched through the device-to-be-notified list area 13*a*. When it is found, the terminal device information is deleted. Next, in S17, the CPU 11 notifies the PC 31 of the removal of the terminal device information from the device-to-be-notified list area 13*a*. It is noted that the steps S15-S17 can be indicated as shown in FIG. 3C. In S15, if the received data is not an unsubscribe request (S25: NO), the process proceeds to S18. In S18, the CPU 11 performs other step corresponding to the received data. The other process may be, for example, when the received data is image data to be printed, a printing process to form an image on a recording sheet based on the received image data. In S19, the connection with the PC 31 is terminated. Thereafter, the data receiving process is terminated.

In the data receiving process as described above, the MFP 1 can receive the subscribe request and the unsubscribe request from the PC 31. When the MFP 1 receives the subscribe request, necessary information can be extracted therefrom to generate the terminal device information and stored in the device-to-be-notified list area 13*a*. When the MFP 1 receives the unsubscribe request, the terminal device information which has the ID information identical to the ID information being included in the unsubscribe request can be deleted from the device-to-be-notified list area 13*a*.

As the data receiving process is terminated, the process returns to S4 (FIG. 6) in the main process. In S4, it is judged as to whether an event has occurred in the MFP 1. If an event has occurred (S4: YES), in S5, an event notifying process is performed. If no event has occurred (S4: NO), the process proceeds to S6.

The event notifying process according to the present embodiment will be described with reference to FIG. 8. In the event notifying process, the MFP 1 delivers the event information to the PCs 31 when an event occurs. Further, when the delivery of the event information to a certain PC 31 fails, terminal device information, which includes an IP address and a port number being identical to an IP address and a port number included in terminal device information in a subscribe request to request for delivery of the event information, is removed from the device-to-be-notified list area 13*a*.

When the event notifying process starts, in S21, a data piece of terminal device information is obtained from one of the status event device list 13*a*1, the element event device list 13*a*2, and the job event device list 13*a*3 in the device-to-be-notified list area 13*a*. (The one of the event device lists 13*a*1-13*a*3 to be obtained the terminal device information is determined based on the event type of the event occurred.) When the terminal device information is obtained, in S22, the CPU 11 attempts to connect the MFP 1 with the PC 31 indicated by an IP address being included in the terminal device information obtained in S21 through a port having a port number, which is indicated in the terminal device information obtained in S21.

In S23, it is judged as to whether the connection with the PC 31 is established. If the connection is established (S23: YES), in S24, the event information corresponding to the event occurred in the MFP 1 is delivered. In S25, it is judged as to whether receipt notification to notify that the PC 31 received the event information is received. If no receipt notification is received (S25: NO), the process repeats S25 until the receipt notification is received. When the receipt notification is received (S25: YES), in S26, the CPU 11 disconnects the PC 31 from the MFP 1. It is noted that the steps S22-S26 can be indicated as shown in FIG. 3B.

Meanwhile, in S23, if the connection is not established (S23: NO), in S27, connecting the MFP 1 with the PC 31, indicated in the terminal device information being obtained in S21, is attempted. Thus, in the present embodiment, the connection with the PC 31 is attempted twice when the event information is undeliverable; however, the number to repeat the attempt is not limited but can be arbitrarily determined. The terminal device information of the PC 31, to which the event information is undeliverable, is removed from the device-to-be notified list area 13*a* when the attempt to connect the MFP 1 with the PC 31 fails for a predetermined number of times (in S29, which will be described later). Therefore, the terminal device information of the PC 31, which can receive the event information but to which the event information is temporarily undeliverable due to a defective condition, can be prevented from being removed from the device-to-be-notified list area 13*a*.

Next, in S28, it is judged as to whether the connection with the PC 31 is established. If the connection is established (S28: YES), in S24, the event information corresponding to the event occurred is delivered to the PC 31. When the connection is not established (S28: NO), in S29, the terminal device information of the PC 31, which failed to be connected with the MFP 1, is removed from the one of the status event device list 13*a*1, the element event device list 13*a*2, and the job event device list 13*a*3, which corresponds to the type of the event occurred, in the device-to-be-notified list area 13*a*.

Thereafter, in S30, the entire device-to-be-notified list area 13*a* is searched through to detect another piece of the terminal device information having the IP address and the port number being identical to the IP address and the port number of the PC 31 which failed to be connected with the MFP 1. In S31, it is judged as to whether another piece of terminal device information is detected. If no data piece of the terminal device information is detected (S31: NO), the process proceeds to S33. Meanwhile, if one or more data piece of the terminal device information is detected (S31: YES), in S32, all of the terminal device information being detected is removed from the device-to-be-notified list area 13*a*. Thereafter, the process proceeds to S33.

Thereafter, in 33, it is judged as to whether all of the status event device list 13*a*1, the element event device list 13*a*2, and the job event device list 13*a*3 in the device-to-be-notified list area 13*a* are searched through to obtain all the data pieces of terminal device information corresponding to the event occurred. If all the data pieces of the terminal device information are obtained (S33: YES), the event notifying process is terminated. If not all the terminal device information is obtained (S33: NO), the process returns to S21 and repeats S21-S32.

In the event notifying process as shown in FIG. 8, the MFP 1 can deliver the event information to the PC 31 which requested for the event information. Further, when the event information is undeliverable to a certain PC 31, all the terminal device information of the PC 31 having the IP address and the port number, which are identical to the IP address and the port number in the terminal device information being included in the subscribe request issued from the PC 31, is removed from the device-to-be-notified list area 13*a*. Therefore, unnecessary process to attempt to deliver the event information to the PC 31 which is incapable of receiving the event information can be prevented, and the event information can be delivered to the PC 31 which is capable of receiving the event information effectively.

Next, with reference to FIG. 4A, an example in which event information is undeliverable to the terminal device A (see FIG. 1) will be described. FIG. 4A illustrates contents of the device-to-be-notified list area 13*a* in the RAM 13 according to the embodiment of the present invention. It is shown in FIG. 4A that a subscribe request for a status event from the terminal A and a subscribe request for an element event from the terminal A, a subscribe request for a status event from the terminal B were issued and transmitted to the MFP 1. The MFP 1 receiving the subscribe requests generates terminal device information X, Y, and Z for the terminal devices A, B, and A respectively. The terminal device information X and Y are stored in the status event device list 13*a*1, and the terminal device information Z is stored in the element event device list 13*a*2.

For example, an IP address and a port number included in the terminal device information X for the terminal device A are "192.168.1.1" and "20" respectively. Meanwhile, an IP address and a port number included in the terminal device information Z for the terminal device A are "192.168.1.1" and "20" respectively. Further, an IP address and a port number included in the terminal device information Y for the terminal device B are "192.168.1.55" and "20" respectively.

When a "no-ink event," which is an error event (see FIG. 5A), occurs in the MFP 1, event information concerning the error is delivered to the terminal devices A and B respectively. That is, the event information is delivered based on the IP addresses and the port numbers included in the terminal device information X and Y, which is stored in the status event device list 13*a*1. More specifically, the event information is transmitted to the terminal device A, which is identified by the IP address "192.168.1.1" and the port number "20" as indicated by the terminal device information X. Further, the identical event information is transmitted to the terminal device B, which is identified by the IP address "192.168.1.55" and the port number "20" as indicated by the terminal device information Y.

In the above configuration, when the event information is delivered to the terminal device B but is not delivered to the terminal device A, the terminal device information X concerning the terminal device A is removed from the status event device list 13*a*1. (The removal corresponds to S29 in FIG. 8.) Further, the device-to-be-notified list area 13*a* is searched through to detect terminal device information including the IP address "192.168.1.1" and the port number "20." In the present example, the terminal device information Z including the IP address "192.168.1.1" and the port number "20" is detected. Therefore, the terminal device information Z is removed from the element event device list 13*a*2. (The removal corresponds to S30-S32 in FIG. 8.) Thus, hereinafter, delivery of event information to the terminal device A is prevented; therefore, smooth delivery of the event information to the terminal device B can be maintained.

Thereafter, the process returns to S6 in FIG. 6. In S6, a validity period examining process will be performed. Following the validity period examining process, the process returns to S2 to repeat S2-S6.

Hereinafter, referring to FIG. 9, the validity period examining process will be described. FIG. 9 is a flowchart to illustrate the validity period examining process according to the embodiment of the present invention. In the validity period examining process, validity periods included in the terminal device information, which is stored in the terminal list area 13*a*, are examined. Further, the terminal device information having expired validity periods is deleted from the terminal list area 13*a*.

As the validity period examining process starts, in S41, a piece of terminal device information in the terminal list area 13*a* is obtained, and in S42, current time is obtained from the clock circuit 18. In S43, it is judged as to whether the current time has passed the validity period. If the current time has passed the validity period (S43: YES), in S44, the terminal device information obtained in S41 is deleted from the terminal list area 13*a*. In S43, if the current time is within the validity period and not passed the validity period (S43: NO), the process proceeds to S45.

In S45, it is judged as to whether the entire device-to-be-notified list area 13*a* is searched through obtain the terminal device information. If the entire device-to-be-notified list 13*a* is searched through (S45: YES), the validity period examining process is terminated. In S45, if the entire device-to-be-notified list area 13*a* is not searched through (S45: NO), the process returns to S41 to repeat the steps S41 through S45.

In the validity period examining process as described above and shown in FIG. 9, validity of the terminal device information stored in the terminal list area 13*a* can be checked so that invalid terminal device information can be removed from the terminal list area 13*a*. Therefore, the event information can be provided to the PCs 31 which are validly subscribed.

Next, referring to FIG. 10, a variation of the event notifying process (S5) according to the embodiment of the present invention will be described. FIG. 10 is a flowchart to illustrate the variation of the event notifying process according to the embodiment of the present invention.

In the event notifying information generating process, In the event notifying process, the MFP 1 delivers the event information to the PCs 31 when an event occurs. Further, when the delivery of the event information to a certain PC 31 fails, terminal device information, which includes an IP address and a port number being identical to an IP address and a port number included in terminal device information in a subscribe request to request for delivery of the event information, is removed from the device-to-be-notified list area 13*a*. Furthermore, terminal device information, which includes an IP address identical to the IP address included in the terminal device information in the subscribe request and a port number different from the port number included in the terminal device information in the subscribe request, is searched through in the device-to-be notified list area 13*a*. Connection between the PC 31 with such terminal device information is attempted, and if the connection fails, all the terminal device information in the device-to-be-notified list area 13*a* having the IP address and the port number which are incapable to be connected is removed from the device-to-be-notified list area 13*a*.

The port number is identifying number of an application program in the PC 31 to which the event information is delivered among a plurality of application programs installed in the PC 31. Thus, all the terminal device information having the IP address and the port number which are incapable of being notified of the event is deleted so that delivery of the event information to the applications which are inoperable in the PC 31 is prevented, and a notifying process which would not be completed is prevented from occurring. Therefore, delivery of the event information to capable client devices can be effectively executed.

When the event notifying process starts, in S51, a data piece of terminal device information is obtained from one of the status event device list 13*a*1, the element event device list 13*a*2, and the job event device list 13*a*3 in the device-to-be-notified list area 13*a*. (The one of the event device lists 13*a*1-13*a*3 to be obtained the terminal device information is determined based on the event type of the event occurred.) When the terminal device information is obtained, in S52, the CPU 11 attempts to connect the MFP 1 with the PC 31 indicated by an IP address being included in the terminal device information obtained in S21 through a port having a port number, which is indicated in the terminal device information obtained in S51.

In S53, it is judged as to whether the connection with the PC 31 is established. If the connection is established (S53: YES), in S54, the event information corresponding to the event occurred in the MFP 1 is delivered. In S55, it is judged as to whether receipt notification to notify that the PC 31 received the event information is received. If no receipt notification is received (S55: NO), the process repeats S55 until the receipt notification is received. When the receipt notification is received (S55: YES), in S56, the CPU 11 disconnects the PC 31 from the MFP 1

Meanwhile, in S53, if the connection is not established (S53: NO), in S57, connecting the MFP 1 with the PC 31, indicated in the terminal device information being obtained in S51, is attempted. Thus, in the present embodiment, the connection with the PC 31 is attempted twice when the event information is undeliverable; however, the number to repeat the attempt is not limited but can be arbitrarily determined. The terminal device information of the PC 31, to which the event information is undeliverable, is removed from the device-to-be notified list area 13a when the attempt to connect the MFP 1 with the PC 31 fails for a predetermined number of times. Therefore, the terminal device information of the PC 31, which can receive the event information but to which the event information is temporarily undeliverable due to a defective condition, can be prevented from being removed from the device-to-be-notified list area 13a.

Next, in S58, it is judged as to whether the connection with the PC 31 is established. If the connection is established (S58: YES), in S54, the event information corresponding to the event occurred is delivered to the PC 31. When the connection is not established (S58: NO), in S59, the terminal device information of the PC 31, which failed to be connected with the MFP 1, is removed from the one of the status event device list 13a1, the element event device list 13a2, and the job event device list 13a3, which corresponds to the type of the event occurred, in the device-to-be-notified list area 13a.

Thereafter, in S60, the entire device-to-be-notified list area 13a is searched through to detect another piece of the terminal device information having the IP address being identical to the IP address of the PC 31 which failed to be connected with the MFP 1. In S61, all of the terminal device information having the IP address and the port number identical to the IP address and the port number of the PC 31 which failed to be connected with the MFP 1 among the terminal device information detected in S60 is removed from the device-to-be-notified list area 13a.

Thereafter, in S62, it is judged as to whether terminal device information, having the IP address being identical to the IP address of the PC 31 which failed to be connected with the MFP 1 and a port number being different from the port number of the PC 31, among the terminal device information detected in S60, is detected. If no such data piece of the terminal device information is detected (S62: NO), the process proceeds to S69. Meanwhile, if one or more data piece of the terminal device information is detected (S62: YES), in S63, one piece of the terminal device information being detected is obtained.

In S64, the CPU 11 attempts to connect the MFP 1 with the PC 31 indicated by the IP address, which is included in the terminal device information obtained in S63, through the different port number of the PC 31 detected in the S62. In S65, it is judged as to whether the connection is established. In S65, if it is judged that the connection is established (S65: YES), the CPU 11 disconnects the PC 31 from the MFP 1. In S65, if the connection is not established (S65: NO), in S66, all the terminal device information, having the IP address and the port number identical to the IP address and the port number which failed to be connected, is removed from the device-to-be-notified list area 13a.

Thereafter, in S68, it is judged as to whether all the terminal device information detected in S60 is obtained. If there is a remaining piece of terminal device information (S68: NO), the process returns to S63 to repeat S63-S67. If all the terminal device information detected in S60 is obtained (S68: YES), the process proceeds to S69.

In S69, it is judged as to whether all of the status event device list 13a1, the element event device list 13a2, and the job event device list 13a3 in the device-to-be-notified list area 13a are searched through to obtain all the data pieces of terminal device information corresponding to the event occurred. If all the data pieces of the terminal device information are obtained (S69: YES), the event notifying process is terminated. If not all the terminal device information is obtained (S69: NO), the process returns to S51 and repeats S51-S68.

In the event notifying process as shown in FIG. 10, the MFP 1 can deliver the event information to the PC 31 which requested for the event information. Further, when the event information is undeliverable to a certain PC 31, all the terminal device information of the PC 31 having the IP address and the port number, which are identical to the IP address and the port number in the terminal device information being included in the subscribe request issued from the PC 31, is removed from the device-to-be-notified list area 13a. Therefore, unnecessary process to attempt to deliver the event information to the PC 31 which is incapable of receiving the event information can be prevented, and the event information can be delivered to the PC 31 which is capable of receiving the event information effectively.

Moreover, connection with the PC 31 which is indicated by the terminal device information having an identical IP address and a different port number is examined so that the other terminal device information including the identical IP address and the different port number can be removed from the device-to-be notified list area 13a when the connection fails to be established.

According to the present embodiment, the port number refers to an identifying number of an application program in the PC 31, among a plurality of application programs, to which the event information is delivered. Therefore, when all the terminal device information including the IP address of the undeliverable PC 31 and the undeliverable port number is deleted, delivery of the event information to all the applications which are inoperable can be restricted. Further, a notifying process which would not be completed is prevented from occurring. Therefore, delivery of the event information to capable client devices can be effectively executed.

Next, an example, in which delivery of the event information to the terminal device A fails, will be described with reference to FIG. 4A. FIG. 4A illustrates contents of the device-to-be-notified list area 13a in the RAM 13 according to the embodiment of the present invention. It is shown in FIG. 4A that a subscribe request for a status event from the terminal A, a subscribe request for an element event from the terminal A, a subscribe request for a status event from the terminal B were issued and transmitted to the MFP 1.

For example, an IP address and a port number included in the terminal device information X for the terminal device A are "192.168.1.1" and "20" respectively. Meanwhile, an IP address and a port number included in the terminal device information Z for the terminal device A are "192.168.1.1" and "40" respectively. Further, an IP address and a port number included in the terminal device information Y for the terminal device B are "192.168.1.55" and "20" respectively.

It is noted that the IP addresses are identical to each other but the port numbers are different between the terminal device information X and Z for the terminal device A. Therefore, an application A using the port number "20" and a different application B using the port number "40" are respectively running in the terminal device A. That is, the terminal device information X has been created based on a subscribe request issued in the application A to the MFP 1, while the terminal device information Z has been created based on a subscribe request issued in the application B to the MFP 1. Meanwhile, solely one application program is running in the terminal device B.

When a "no-ink event," which is an error event (see FIG. 5A), occurs in the MFP 1, event information concerning the error is delivered to the terminal devices A and B respectively. That is, the event information is delivered based on the IP addresses and the port numbers included in the terminal device information X and Y, which is stored in the status event device list 13a1. More specifically, the event information is transmitted to the terminal device A, which is identified by the IP address "192.168.1.1" and the port number "20" as indicated by the terminal device information X. Further, the identical event information is transmitted to the terminal device B, which is identified by the IP address "192.168.1.55" and the port number "20" as indicated by the terminal device information Y.

In the above configuration, when the event information is delivered to the terminal device B but is not delivered to the terminal device A, the terminal device information X concerning the terminal device A is removed from the status event device list 13a1. (The removal corresponds to S59 in FIG. 10.) Further, the device-to-be-notified list area 13a is searched through to detect terminal device information including the IP address "192.168.1.1" and the port number "20." All the detected terminal device information is removed from the device-to-be-notified list area 13a. (The removal corresponds to S60, S61 in FIG. 10.)

Thereafter, the terminal device information Z including the IPaddress "192.168.1.1" and a different port number "40" is detected. Accordingly, connection with the application B in the terminal device A, which is identified by the IP address "192.168.1.1" and the port number "40" included in the terminal device information Z, is attempted. (The attempt corresponds to S64 in FIG. 10.)

If the connection is established, it is judged that the application B in the terminal device A is capable of communicating with the MFP 1. Therefore, the terminal device information Z is not removed but maintained in the device-to-be-notified list area 13a, and the process s terminated. If the connection is not established, it is judged that the application B as well as the application B is inoperable, and all the terminal device information having the undeliverable IP address "192.168.1.1" and the port number "40" is removed from the device-to-be-notified list area 13a. (The removal corresponds to S62-S66 in FIG. 10.)

Thus, hereinafter, delivery of event information to the inoperable application programs in the terminal device A is prevented; therefore, smooth delivery of the event information to the terminal device B can be maintained.

Although an example of carrying out the invention has been described, those skilled in the art will appreciate that there are numerous variations and permutations of the information processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the terminal device information, including the ID information, the location information (i.e., URL), the validity period, is generated based on the subscribe request, which is issued by the PC 31 to the MFP 1 to be stored in the terminal list area 13a. However, if the location information in the subscribe request is a hostname, and if the MFP 1 and the PC 31 communicate with each other in TCP/IP, the hostname of the PC 31 can be converted into an IP address so that the MFP 1 can generate the terminal device information based on the IP address. A hostname can be converted into an IP address when the MFP 1 makes an inquiry to a specific computer which is called a DNS server. However, if the hostname is preliminarily converted into the IP address and stored in a predetermined storage area, the notification of the event information can be conducted more efficiently.

For another example, the number of pieces of terminal device information to be included in the terminal list area 13a can be arbitrarily limited according to various factors such as processing capacity of the CPU 11 of the MFP 1 and data communication rate in the LAN 200. It is noted that, some terminal devices may not be notified of event information for some events due to the limitation, however, delay in notification of the event information to the other terminal devices that are allowed to be notified can be controlled. Specifically, as the number of the terminal devices to be notified is limited, the terminal device information of the PCs 31 which are not connected with the MFP 1 is removed so that the other PCs 31 which are communicable with the MFP 1 can be effectively notified of the event information.

Further, the event information of a plurality of events may be delivered to the terminal devices in chronological order, specifically in case the order of the events, such as a "cover-open" event and a "cover-closed" event, to occur in the MFP 1 connote specific meanings. In such a configuration, even when delivery of event information to an inoperable terminal device fails, delay of delivery of event information concerning a subsequent event to a communication-capable terminal device can be prevented.

In the above embodiment, a subscribe request from the terminal device includes information concerning a type of the event to be notified and is issued on a basis of the type. However, the terminal device can request for the event information on an event basis. For example, the terminal device can request for event information concerning a specific event, e.g., a "cover-open" event, a "no-ink" event, rather than concerning a "status event." Thus, delivery of specific event information which is unnecessary in the terminal device can be avoided.

In the above embodiment, ID information included in a subscribe request is generated in the PC 31; however, the ID information may be generated in the MFP 1. When the ID information is generated in the MFP 1, the subscribe request issued from the PC 31 includes location information, event type information, and validity period information, excluding the ID information. The MFP 1 receiving the subscribe request transmits the ID information to the PC 31 in return. In this configuration, MFP 1 transmitting the event information can manage an entire set of the information concerning the delivery.

What is claimed is:

1. An information processing apparatus comprising:
a request receiving unit configured to receive, from a client device, a request issued by the client device;
a destination device determining unit configured to determine the client device which issued the request as a destination device to which event information regarding an event occurred in the information processing apparatus is to be provided;
storing unit configured to store destination device information specifying the destination device;
an event information providing unit configured to provide the event information to a first client device according to first destination device information when the first destination device information specifying the first client device is stored in the storing unit;
a first cancellation unit configured to invalidate the first destination device information in the storing unit when delivery of the event information to the first client device fails;
a determining unit configured to determine second destination device information which specifies a device being identical to the first client device specified by the first destination device information by searching the storing unit; and
cancellation unit configured to invalidate the second destination device information in the storing unit when the delivery of the event information to the first client device fails.

2. The information processing apparatus according to claim 1,
wherein the first cancellation unit includes a first removal unit configured to remove the first destination device information from the storing unit when the delivery of the event information to the first client device fails; and
wherein the second cancellation unit includes a second removal unit configured to remove the second destination information from the storing unit when the delivery of the event information to the first client device fails.

3. The information processing apparatus according to claim 2,
wherein the first and second destination device information include first ID information to identify the client device which issued the request and second ID information to identify an application program in the client device to which the event information is delivered; and
wherein the second removal unit is configured to removes the second destination device information from the storing unit when the first ID information and the second ID information included in the second destination device information are identical to the first ID information and the second ID information included in the first destination device information respectively.

4. The information processing apparatus according to claim 2,
wherein the first and second destination device information include first ID information to identify the client device which issued the request and second ID information to identify an application program in the client device to which the event information is delivered;
wherein the information processing apparatus is provided with a judging unit configured to judge as to whether a device specified by the second destination device information is capable of being connected with the information processing apparatus for data exchange when the second destination device information includes the first ID information being identical to the first ID information of the first destination device information and the second ID information being different from the second destination device information of the first ID information,
wherein the second removal unit is configured to removes the second destination device information from the storing unit when the judging unit judges that the device specified by the second destination device information is incapable of being connected with the information processing apparatus for data exchange.

5. The information processing apparatus according to claim 4,
wherein the second removal, unit is configured to maintains the second destination device information in the storing unit when the judging unit judges that the device specified by the second ID information is capable of being connected with the information processing apparatus.

6. The information processing apparatus according to claim 2,
wherein the event information providing unit is configured to repeat attempting to provide the event information to the first client device for a predetermined number of times until the event information is successfully delivered to the first client device; and
wherein the first removal unit is configured to removes the first destination device information from the storing unit when a number of unsuccessful attempts for delivery of the event information amounts to the predetermined times.

7. A computer-readable storage device comprising computer readable instructions for controlling an information processing apparatus to monitor an event which occurs in the information processing apparatus and provide event information concerning the event to at least one client device which is connectable with the information processing apparatus by executing steps of:
receiving, from a client device, a request issued by the client device;
determining the client device which issued the request as a destination device to which the event information regarding an event occurred in the information processing apparatus is to be provided;
specifying the destination device storing unit;
providing the event information to a first client device according to first destination device information when the first destination device information specifying the first client device is stored in the storing unit;
canceling the first destination device information in the storing unit when delivery of the event information to the first client device fails; and
determining second destination device information which specifies a device being identical to the first client device specified by the first destination device information by searching the storing unit; and
canceling the second destination device information in the storing unit when the delivery of the event information to the first client device fails.

8. The computer-readable storage device according to claim 7,
wherein the step to cancel the first destination device includes removing the first destination device information from the storing unit when the delivery of the event information to the first client device fails; and wherein the step to cancel the second destination device includes removing the second destination information from the storing unit when the delivery of the event information to the first client device fails.

9. The computer-readable storage device according to claim 8,
wherein the first and second destination device information include first ID information to identify the client device which issued the request and second ID information to identify an application program in the client device to which the event information is delivered; and
wherein the second destination device information in the storing unit is removed when the first ID information and the second ID information included in the second destination device information are identical to the first ID information and the second ID information included in the first destination device information respectively.

10. The computer-readable storage device according to claim 8,
wherein the first and second destination device information include first ID information to identify the client device which issued the request and second ID information to identify an application program in the client device to which the event information is delivered;
wherein the steps to be executed for controlling the information processing apparatus further includes a step to judge as to whether a device specified by the second destination device information is capable of being connected with the information processing apparatus for data exchange when the second destination device information includes the first ID information being identical to the first ID information of the first destination device information and the second ID information being different from the second destination device information of the first ID information,
wherein the second destination device information is removed from the storing unit when it is judged in the step to judge that the device specified by the second destination device information is incapable of being connected with the information processing apparatus for data exchange.

11. The computer-readable storage device according to claim 10,
wherein the second destination device information in the storing unit is maintained when it is judged in the step to judge that the device specified by the second ID information is capable of being connected with the information processing apparatus.

12. The computer-readable storage device according to claim 8,
wherein, in the step to provide the event information to the first client device, attempting to provide the event information to the first client device is repeated for a predetermined number of times until the event information is successfully delivered to the first client device; and
wherein the first destination device information is removed from the storing unit when a number of unsuccessful attempts for delivery of the event information amounts to the predetermined times.

\* \* \* \* \*